Sept. 18, 1945.   E. L. PERRY   2,385,230
METHOD OF AND APPARATUS FOR FORMING TUBULAR ARTICLES
Filed Aug. 12, 1942   8 Sheets-Sheet 2
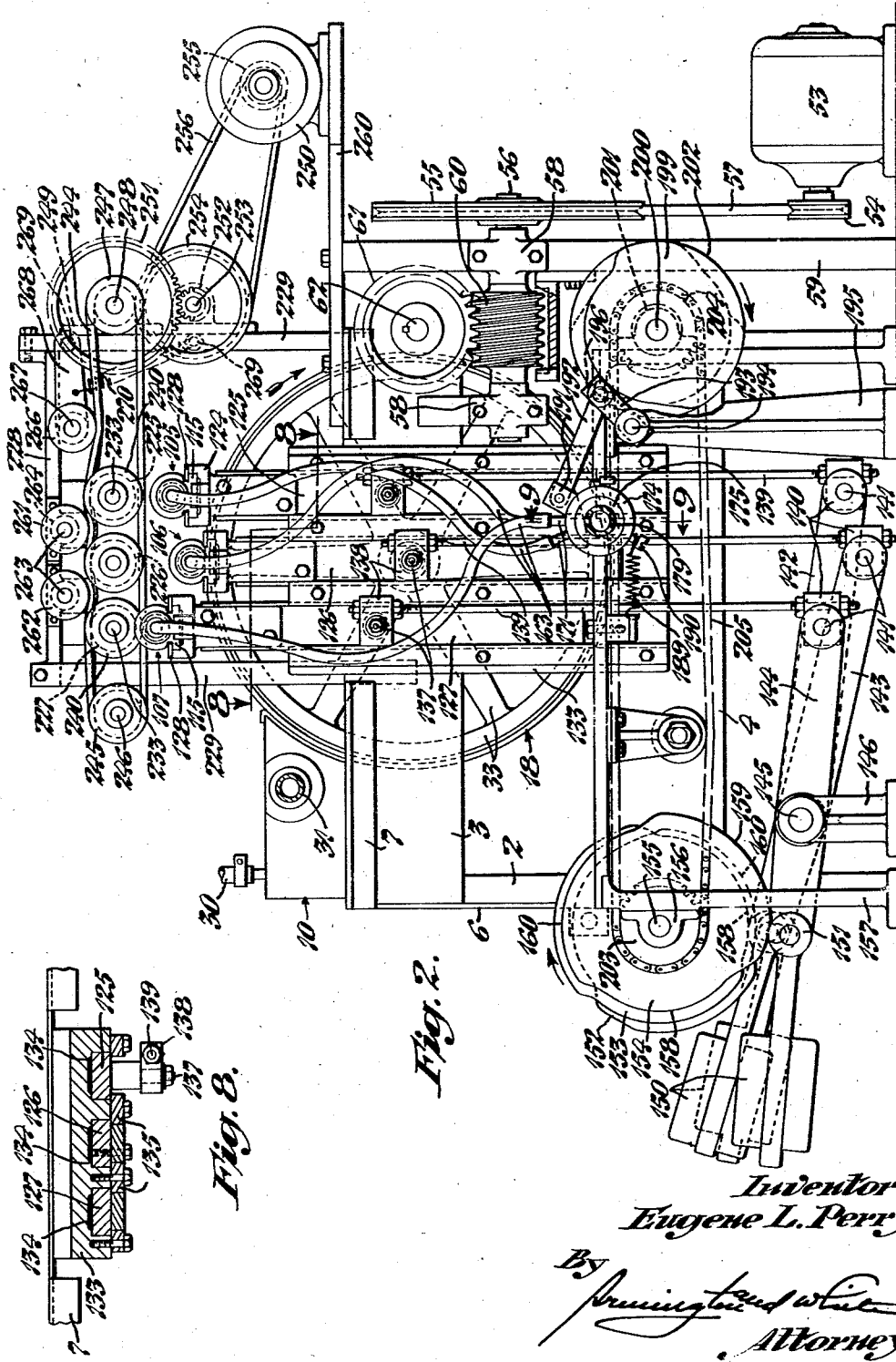
Inventor:
Eugene L. Perry
By
Attorneys.

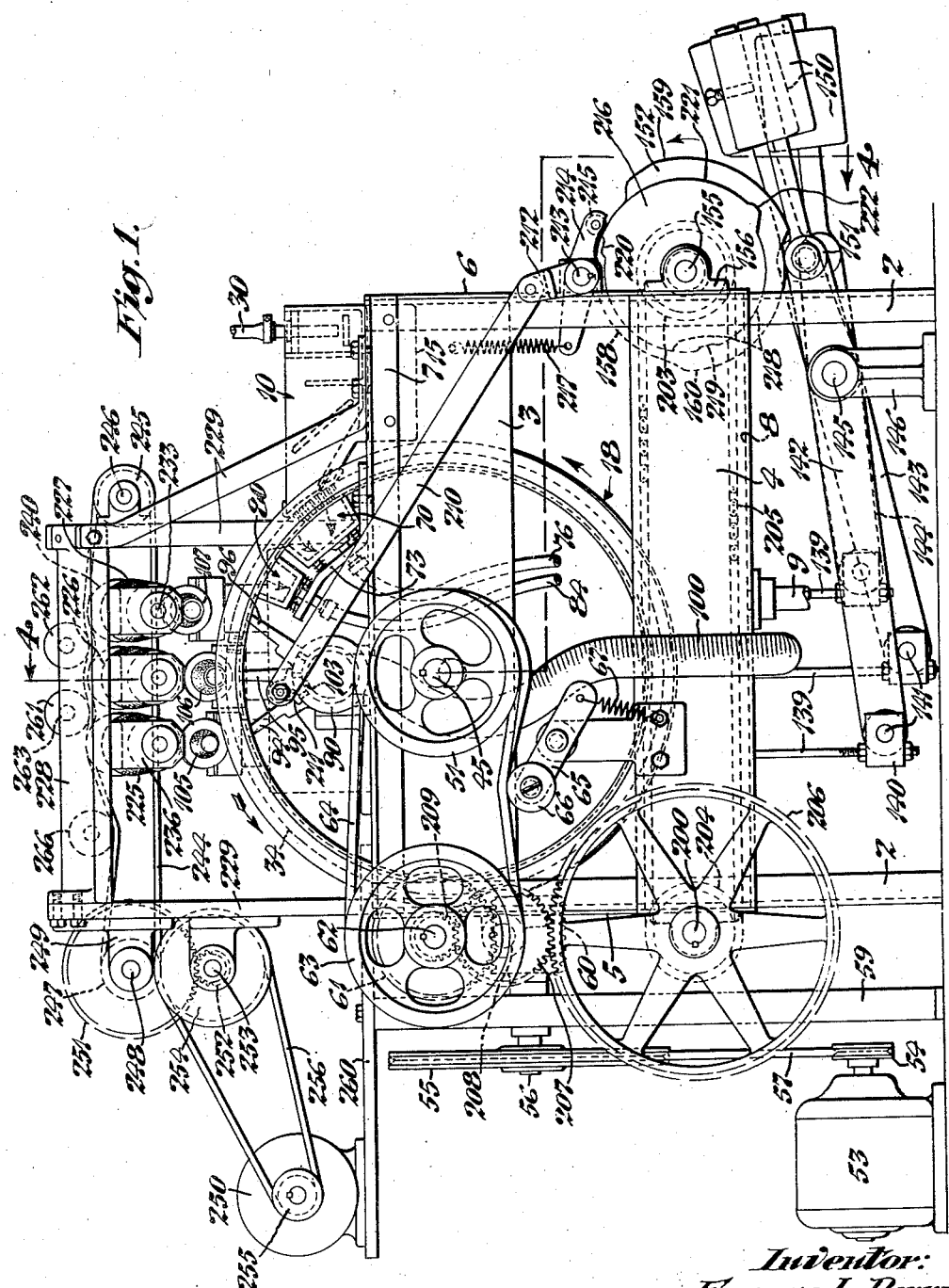

Sept. 18, 1945.   E. L. PERRY   2,385,230
METHOD OF AND APPARATUS FOR FORMING TUBULAR ARTICLES
Filed Aug. 12, 1942   8 Sheets-Sheet 3
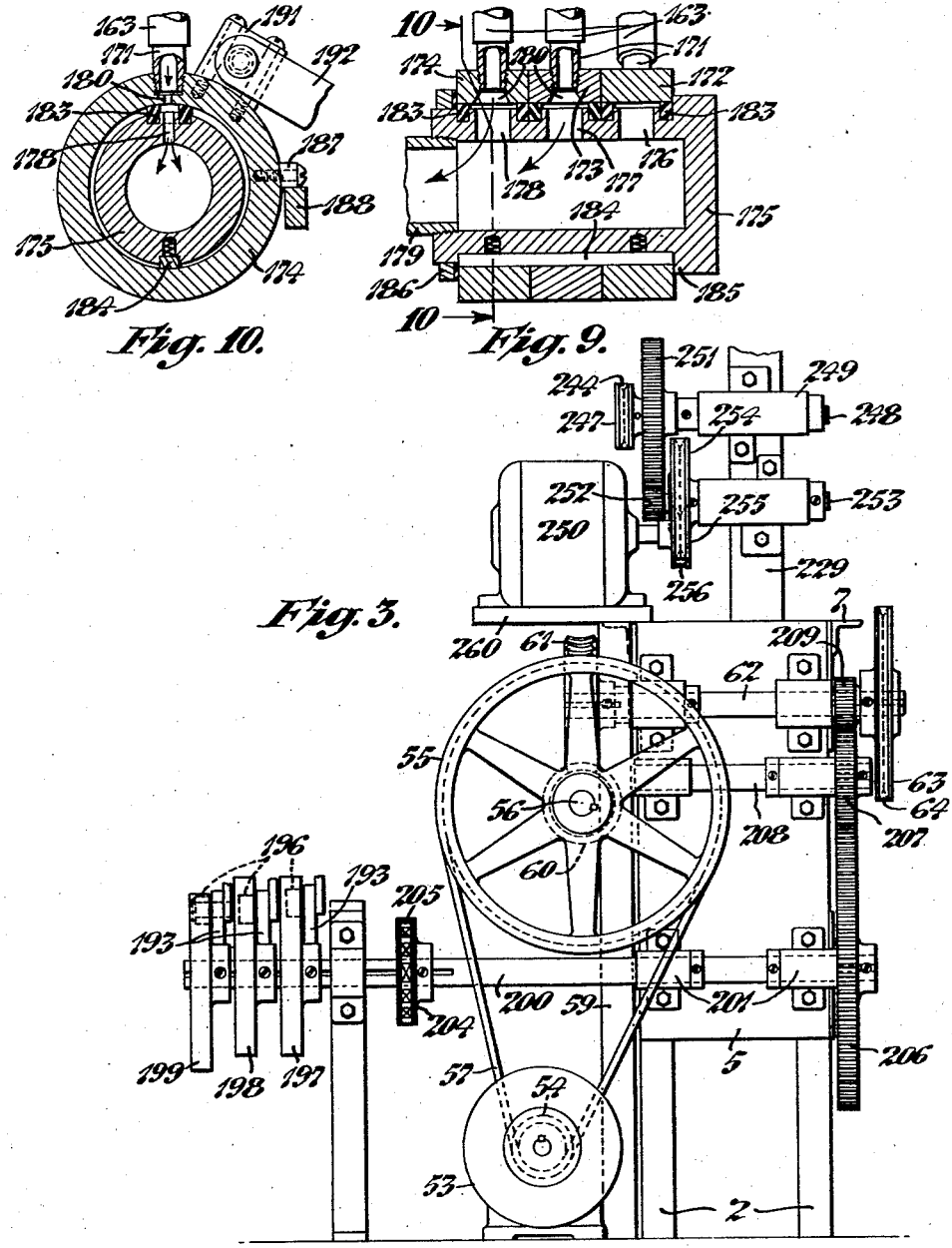
Inventor:
Eugene L. Perry
By Bennington and White
Attorneys Sept. 18, 1945.  E. L. PERRY  2,385,230
METHOD OF AND APPARATUS FOR FORMING TUBULAR ARTICLES
Filed Aug. 12, 1942  8 Sheets-Sheet 4
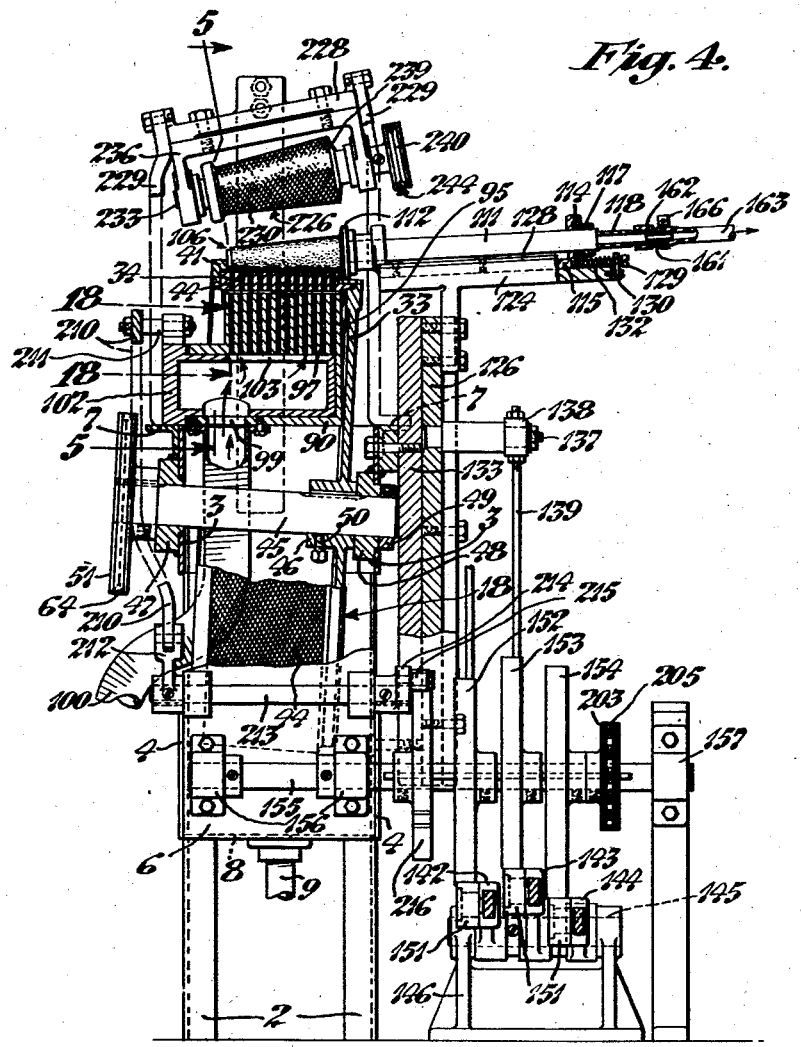
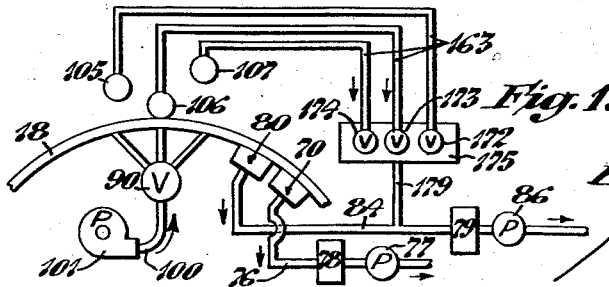
Inventor:
Eugene L. Perry
By
Attorneys.

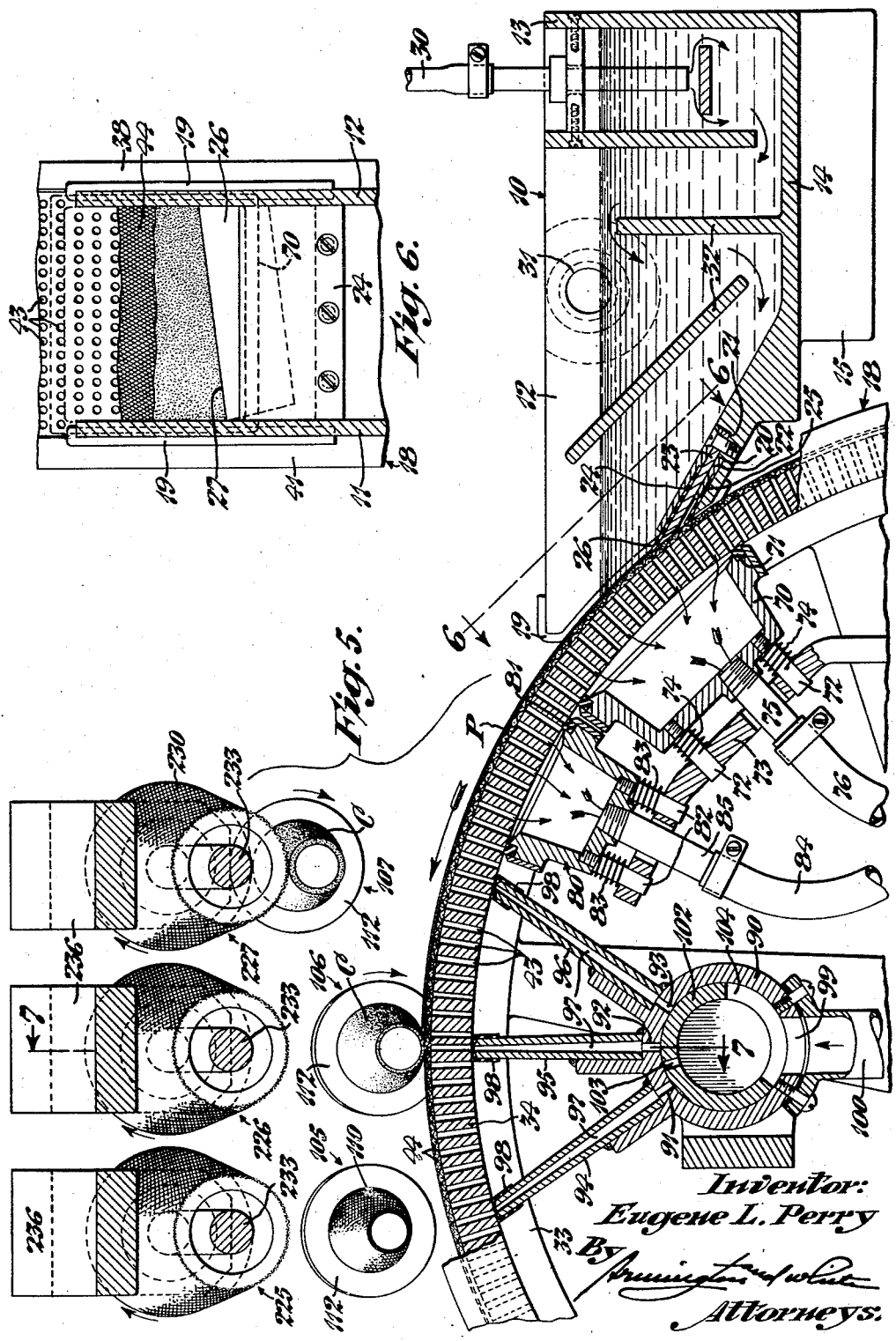

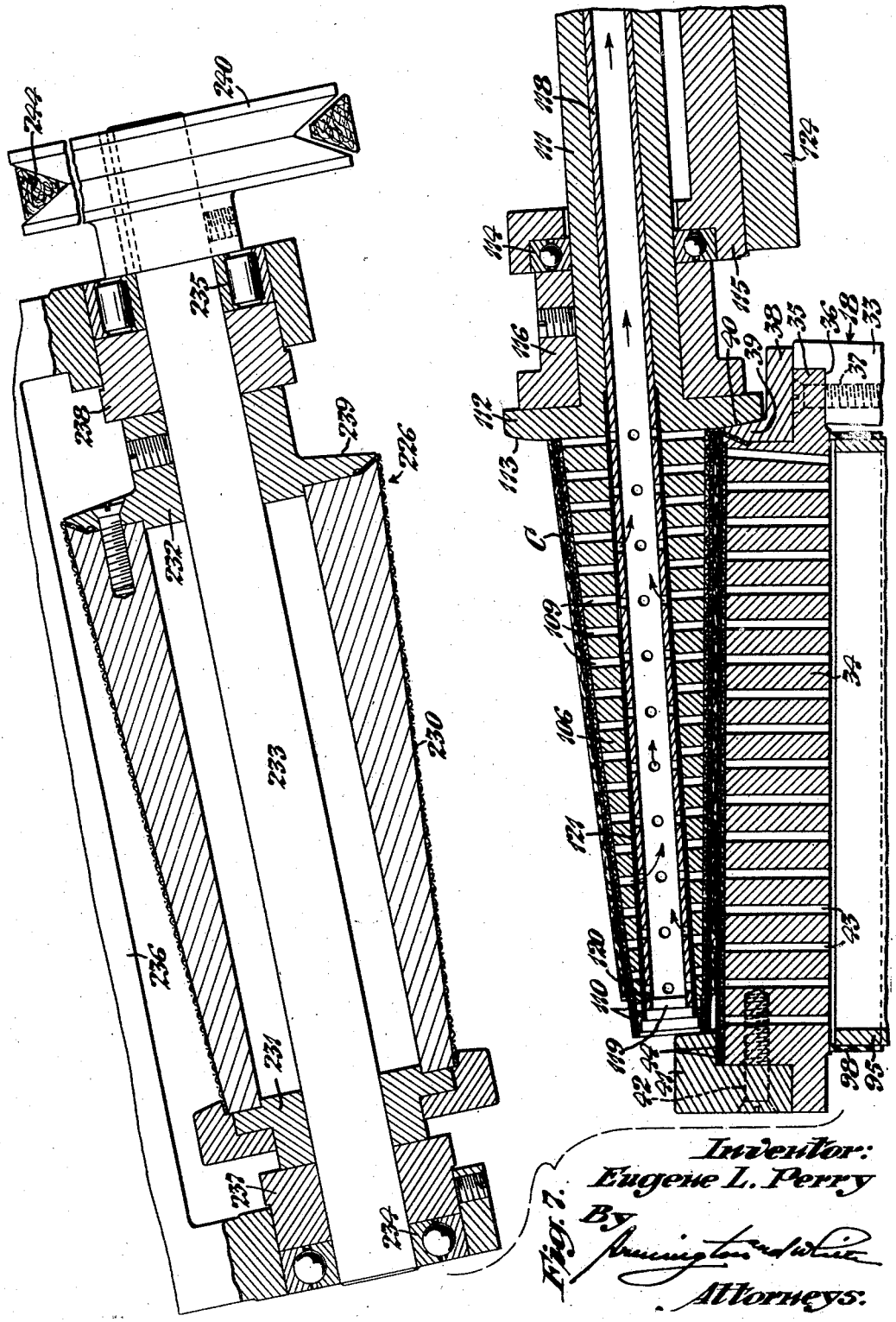

Inventor:
Eugene L. Perry
By his Attorneys

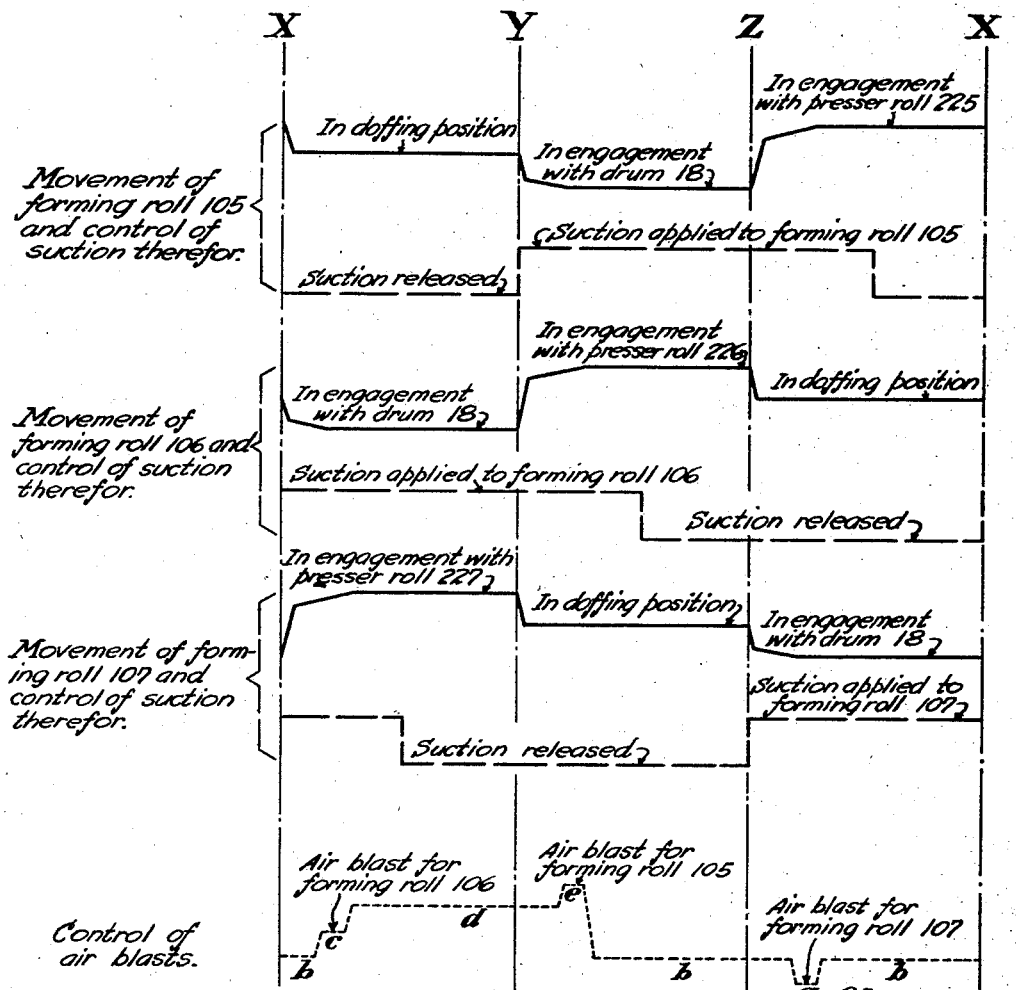
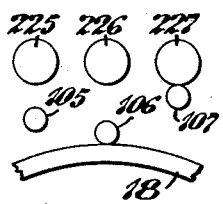 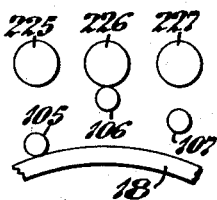 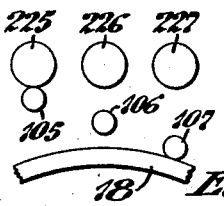 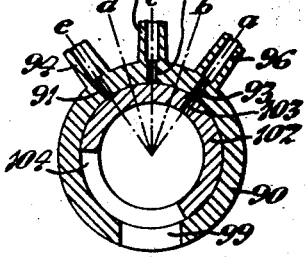
Fig. 15.  Fig. 16.  Fig. 17.
Inventor:
Eugene L. Perry Patented Sept. 18, 1945

2,385,230

UNITED STATES PATENT OFFICE 2,385,230

METHOD OF AND APPARATUS FOR FORMING TUBULAR ARTICLES

Eugene L. Perry, Bloomfield, N. J., assignor to Universal Winding Company, Boston, Mass., a corporation of Massachusetts Application August 12, 1942, Serial No. 454,560

25 Claims. (Cl. 92—66)

This invention relates to a method of and apparatus for forming tubular articles, such as hollow cores of cylindrical or conical shape for use in the textile art, from material of a fibrous nature. While the invention is hereinafter described and illustrated, by way of example, for making textile cores or cones on which yarn or thread is wound, the present method and apparatus are of broader utility for producing tubular articles of other types. Paper tubes and cones are employed in the textile industry as cores for supporting wound masses of yarn and thread in cylindrical and conical packages from which the yarn or thread may be unwound to supply it to knitting and other machines or in transfer processes, such as creeling and beaming. The conical shape of the core or tube for supporting the textile material is of advantage in facilitating the delivery of the yarn in unwinding it therefrom and in the following description such tapered or conical cores are referred to as "cones" without intent thereby to limit the scope of the invention.

The practice now commonly used for producing textile cores or cones consists in winding paper in layers on a mandrel or arbor and uniting the successive layers with a suitable adhesive. This procedure requires that the fibrous pulp stock first must be made into paper strips; thereafter cut into lengths having curved edges, resulting in considerable waste; and finally winding the strips on the tapered mandrel while uniting them with an adhesive. Cores or tubes of this type, either cylindrical or conical in shape, usually have an undesirable lapped joint on both their inner and outer surfaces; the core cannot be properly balanced about its longitudinal axis except by grinding or buffing it in subsequent operations; and the tubular core usually does not have a true surface of revolution so that it will run out when placed on the spindle or mandrel of the winding or like machine to cause irregularities in the wound package.

One object of the present invention is to provide a method of and an apparatus for automatically and continuously forming textile tubes or cones and similar articles directly from fibrous pulp stock.

Another object is to provide a method of and apparatus for making textile cores or cones having a true surface of revolution with both their inner and outer surfaces concentric to the axis of rotation.

Another object is to provide a method of and apparatus for making articles of the type indicated automatically and continuously without requiring particular skill or expertness on the part of the operator.

Another object is to provide a method of and apparatus for continuously producing tubular articles in sequence from a supply of paper pulp while extracting the liquid from the stock and compressing and solidifying the layers in the walls of the articles.

Another object is to provide an apparatus of the type indicated having a traveling foraminous carrier on which a relatively thin web of pulp is deposited and a plurality of forming rolls to which the pulp is transferred from the carrier to wind it in overlying layers on the forming rolls.

Another object is to provide an apparatus of the type indicated with a rotary drum having a foraminous barrel on which the web of pulp is deposited with the barrel of the drum of conical form and of the same inclination as that of the conical forming roll on which the pulp is deposited.

Another object is to provide an apparatus of the type indicated having means for rotating the forming rolls prior to their contact with the periphery of the drum to insure that the linear velocity at the periphery of the roll is equal to that of the periphery of the drum as the pulp is transferred to the rolls.

Another object is to provide an apparatus of the type indicated having adjustable means for regulating the thickness of the pulp on the transferring drum to apply a variable thickness to the walls of the formed article at its opposite ends.

Another object is to provide an apparatus of the type indicated with presser-rolls for compressing and felting the layers of pulp wound on the forming rolls while the liquid is extracted therefrom.

Another object is to provide an apparatus of the type indicated having means for applying suction within the forming rolls during the application of the pulp thereto and while it is being compressed and compacted thereon, with means for releasing the suction during continued action by the presser-rolls whereby to stretch and loosen the formed articles to facilitate their removal.

Another object is to provide a method of and apparatus for forming tubular articles from fibrous material wherein a plurality of forming rolls or mandrels are treated successively to apply the pulp thereto, extract the liquid therefrom, compress the layers of pulp thereon, and finally stretch the articles and position them for doffing or removal from the forming rolls.

Another object is to provide an apparatus of the type indicated having means for successively moving the forming rolls into engagement with the periphery of the drum carrying the pulp stock to cause layers of the pulp to be applied to the rolls, then away from the drum and into engagement with the presser-rolls and finally to an intermediate stripping position where the articles may be doffed or removed manually.

Further objects of the invention are set forth in the following specification which describes the improved method and a preferred form of the apparatus, by way of example, as illustrated by the accompanying drawings.

In the drawings:

Fig. 1 is a front elevational view of an apparatus or machine incorporating the novel features of the present invention;

Fig. 2 is a rear elevational view showing the slides for moving the forming rolls to various operating positions and the cam-means for operating the slides in timed sequence;

Fig. 3 is an end elevational view showing the driving means for rotating the drum and presser-rolls;

Fig. 4 is a transverse sectional view on line 4—4 of Fig. 1 showing a forming roll in position to receive and wind on the web of wet pulp from the periphery of the drum and illustrating the conical peripheries of the drum and forming roll as having the same angle of inclination;

Fig. 5 is an enlarged sectional view on line 5—5 of Fig. 4 showing a web of wet pulp as being deposited on the periphery of the drum and fed to a forming roll and illustrating the relative positions of the plurality of forming rolls;

Fig. 6 is a transverse sectional view on line 6—6 of Fig. 5 showing the angular baffle-plate for causing a web of pulp to be deposited on the periphery of the drum of gradually increasing thickness across the width thereof;

Fig. 7 is a further enlarged transverse sectional view on line 7—7 of Fig. 5 showing a layer of pulp as being transferred from the barrel of the drum and wound onto the periphery of the forming roll as suction is applied to the interior of the latter;

Fig. 8 is a sectional plan view on line 8—8 of Fig. 2 showing the mounting for the slides which carry the forming rolls;

Fig. 9 is a sectional view on line 9—9 of Fig. 2 showing the suction manifold and ring-valves for controlling the suction applied to the individual forming rolls;

Fig. 10 is a transverse sectional view on line 10—10 of Fig. 9 showing one of the ring-valves in position to aline its port with a cooperating port in the manifold;

Fig. 14 is a chart graphically illustrating the paths of movement of the forming rolls in relation to each other and indicating the periods of application of suction and air blast thereto during the operation of the apparatus;

Fig. 15 is a diagrammatic view showing the position of the plurality of forming rolls relative to the feeding drum and the presser-rolls at one stage in the operation of the apparatus corresponding to their position indicated between lines X and Y of the chart in Fig. 14;

Fig. 16 is a view similar to Fig. 15 showing a later operative position of the forming rolls with respect to the feeding drum and the presser-rolls corresponding to their position indicated between the lines Y and Z of the chart;

Fig. 17 is a view similar to Fig. 15 showing a still later operative position of the forming rolls with respect to the feeding drum and the presser-rolls corresponding to their position indicated between the lines Z and X of the chart;

Fig. 18 is an enlarged sectional view on line 18—18 of Fig. 4 showing the pressure manifold and sleeve-valve for controlling the application of the air blast through the foraminous barrel of the feeding drum to start the winding of the web of pulp onto the periphery of the forming rolls; and Fig. 19 is a diagrammatic view of the pressure and suction systems.

Figure 11:
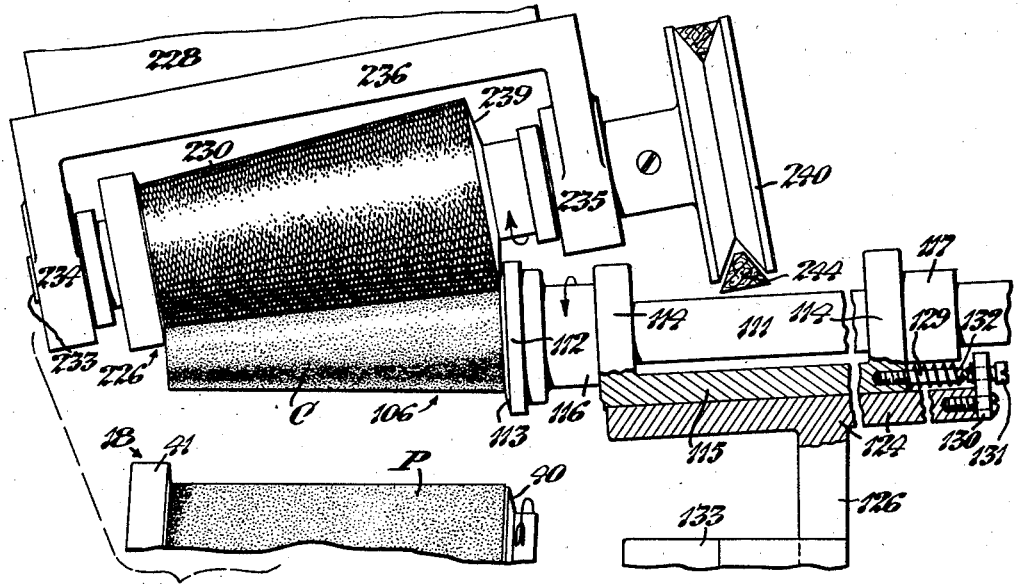
Fig. 11 is a part-sectional view similar to Fig. 7 showing a forming roll as moved to its uppermost position to subject the pulp mass on its periphery to the action of the presser-roll.

The present invention relates in general to a method of and machine for automatically and continuously forming conical cop-tubes and other tubular articles directly from fibrous pulp stock. The wet pulp stock is circulated through a tank or box having an open side adjacent the foraminous barrel of a continuously rotating drum or other traveling conveyer. A suction box within the interior of the barrel of the drum and opposite the open side of the tank operates to draw the liquid stock through the opening to cause a layer or web of pulp to be deposited on the outer periphery of the drum as the latter is rotated. A baffle-plate or blade is positioned between the periphery of the drum and the liquid in the tank to control the amount of pulp deposited on the drum and the baffle is preferably adjustable in angular relation to adapt it to distribute the pulp in a gradually increasing thickness of web laterally of the periphery of the drum. As the drum is continuously rotated the web of wet pulp is fed from the tank onto its periphery and during such feeding a second suction box within the interior of the foraminous barrel of the drum acts to withdraw surplus liquid from the pulp.

A plurality of forming rolls or mandrels, three being shown herein by way of example, of a shape corresponding to that of the articles to be formed, are mounted for vertical movement above the drum. Although the peripheries of the forming rolls and drum may take any desired shape, as herein illustrated they are of conical form to adapt them to produce conical cop-tubes. The conical peripheries of the drum and forming rolls have the same angle of inclination so that the web of pulp deposited on the drum is adapted to be wound in overlying uniform layers on the forming rolls. The forming rolls are supported on slides mounted for vertical movement to carry the rolls toward and away from the periphery of the drum and each forming roll is moved individually into engagement with the periphery of the drum and rotated by the latter to receive the web of pulp therefrom and wind it in overlying layers thereon. The forming roll with the web of pulp wound thereon is then moved vertically above the drum into engagement with a continuously rotating presser-roll which acts to compress the layers of pulp into a homogeneous mass compacted on the conical periphery of the forming roll. The respective forming roll is next moved to an intermediate position between the drum and presser-roll where the formed article may be removed. The slides carrying the forming rolls are moved vertically in timed sequence by suitable operating means so that at any particular stage in the operation of the apparatus one of the forming rolls will be in engagement with the drum, another forming roll will be in engagement with its presser-roll and the third forming roll will be in position for stripping or doffing the formed article therefrom.

The forming rolls are driven in the first instance by friction means on the drum and later by similar means on the presser-rolls prior to the engagement of their peripheries therewith to prevent scuffing or rupture of the delicate web of pulp. At the instance when the periphery of the forming roll contacts the periphery of the drum an air-blast is directed through the foraminous barrel of the latter to cause the web of pulp to be pressed against the periphery of the forming roll. Means are provided for creating suction within each forming roll to cause the web of pulp to be drawn against and held in place on its periphery during the transfer operation and the suction is maintained during the initial period of the engagement of the forming roll with its presser-roll to compact the pulp into a homogeneous mass and extract the liquid therefrom. During the latter part of the compressing operation the suction within the forming roll is released to cause the pulp mass to be stretched and loosened under the pressure whereof to facilitate removal of the formed article from the roll. The valves for controlling the air-blast through the foraminous barrel of the drum and the suction within the forming rolls are operated by the driving means for the drum so that they function in the proper timed sequence.

Referring to Figs. 1 to 3 of the drawings, the main frame of the apparatus or machine comprises upright corner-posts 2 of angle-iron with upper and lower side plates 3 and 4 and opposite single end-plates 5 and 6 connected thereto to provide a rigid box-like structure. Angle-irons 7 extend between the corner-posts 2 above the upper side plates 3 to further reinforce the frame. A horizontal bottom plate 8 is joined to the lower side and end-plates 4 and 6 to provide a pan for collecting surplus liquid and a pipe 9 leads downwardly therefrom for draining off the liquid, see Figs. 1 and 4.

Mounted between the upper side plates 3 at one end of the frame is a tank 10 of box-like form having side walls 11 and 12, an end wall 13 and a bottom wall 14, see Figs. 1, 5 and 6. Flanges 15 depending from the side walls 11 and 12 of the tank are attached to the side plates 3 of the frame to support the tank thereon. The open side of the tank 10 opposite from its end wall 13 is adjacent the periphery of a drum 18, later to be described in detail, which in effect serves as a closure therefor. The ends of the side walls 11 and 12 of the tank 10 are of arcuate contour corresponding to the circumference of the barrel of the drum and the joints between the ends of the side walls of the tank and the barrel of the drum are sealed by suitable packing strips 19. The forward portion of the bottom wall 14 of the tank 10 is inclined upwardly toward the periphery of the drum and has a series of stepped shoulders 20 and 21 for mounting laterally-extending plates 22, 23 and 24, see Fig. 5. Clamped between the plate 22 and the inclined portion of the wall 14 of the tank is a gasket 25 of rubber or other suitable material with its edge bearing against the periphery of the drum 18 to seal the tank against leakage. Clamped between the plates 23 and 24 is a baffle-plate or blade 26 which may be adjusted at various angles so that its upper edge 27 will extend diagonally across the periphery of the drum. The baffle-plate 26 bears against the periphery of the drum 18 and provides an opening at the end of the tank of trapezoidal form with its lower marginal side inclined upwardly at an angle to the horizontal, see Fig. 6.

The tank 10 is adapted to contain the liquid pulp stock which is continuously supplied thereto from a suitable reservoir, not herein shown, through a pipe 30. The fluent pulp may be of paper or wood fiber carried by a liquid such as water containing a binder for amalgamating the fibers when dried and set; but any other suitable fibrous material may be used, for example, textile fiber or the like. The pulp stock is maintained at a predetermined constant level in the tank 10 by means of a return pipe 31 in its side through which the stock is circulated back to the reservoir. Suitable baffles 32 are provided in the tank 10 to prevent excessive agitation of the liquid pulp stock as it flows into the tank so as to maintain the liquid level of the pulp stock substantially constant while also acting to stir and mix the material.

The drum 18, see Figs. 1, 4 and 5, comprises a single spoked wheel 33 and a foraminous barrel 34 of frusto-conical form attached to and projecting laterally from the rim of the wheel. As illustrated more in detail in Fig. 7, the frusto-conical barrel 34 is recessed at one side to provide a lateral flange 35 which seats in an annular recess 36 in the rim of the wheel 33 and is fastened thereto by means of screws 37. Surrounding the flange 35 is a ring 38 having a radial flange 39 which extends to the outer surface of the barrel 34 with its side beveled or inclined to the vertical to provide a frictional driving face 40. Seated in a recess at the opposite rim of the barrel 34 is a ring 41 which extends radially therefrom and is attached to the end of the barrel by means of screws 42. The barrel 34 of the drum 18 has a series of radial holes 43 therein and is covered by one or more layers of fine mesh screen 44 to render it porous, see Fig. 5. The drum 18 is mounted on a shaft 45 which extends through the hub 46 of the wheel 33 and is journaled in bearings 47 and 48 on the opposite side plates 3 of the frame, see Fig. 4. As will be noted by reference to Fig. 4, the shaft 45 is tilted or inclined from the horizontal so that the periphery of the barrel 34 above the shaft extends substantially horizontally. The hub 46 of the wheel 33 is keyed to the shaft 45 for rotation therewith and the shaft is held against axial movement by the hub and a collar 49 fastened to the end of the shaft bearing against the opposite sides of the bearing 48. The hub of the wheel 33 is held in position on the shaft 46 by means of a set-screw 50. Mounted on the opposite end of the shaft 45 from the collar 49 is a pulley 51 having a V-shaped groove in its periphery.

The drum 18 is arranged to be rotated continuously by suitable means such as an electric motor 53 driving through speed-reduction means as illustrated in Figs. 1 and 2. The motor 53 has a pulley 54 on its shaft which drives a pulley 55 fast on a shaft 56 by means of a belt 57. The shaft 56 is journaled in suitable bearing-boxes 58 on the upper side plate 3 of the machine frame and on a column 59 at one side of the frame.

The shaft 56 has a worm-gear 60 fast thereon between the two bearings 58 which meshes with a worm-wheel 61 fast on a shaft 62 journaled in suitable bearings on the machine frame. The shaft 62 mounts a pulley 63 fast on its forward end which drives the pulley 51 on the drum-shaft 45 by means of a belt 64. The belt 64 is held taut by means of a belt-tightener consisting of a pivoted arm 65 carrying an idler pulley 66, the arm being rocked to press the pulley against the belt by means of a spring 67.

Positioned within the interior of the drum 18 at the opposite side of its foraminous barrel 34 from the tank 10 is a suction box 70, see Fig. 5. The suction box 70 is in the form of a rectangular trough which extends throughout the width of the barrel 34 of the drum 18 and has a gasket 71 surrounding its edges for sealing engagement with the drum. The suction box 70 is mounted for movement radially of the drum 18 by means of studs 72 projecting from its bottom and slidable in a bracket 73 supported from the angle-iron cross-member 7 of the machine frame, see Figs. 1 and 5. The suction box 70 is forced against the inner face of the barrel 34 of the drum 18 by springs 74 surrounding the studs 72 and acting between the bracket 73 and the bottom of the box to maintain the gasket 71 in sealing engagement with the drum. A nipple 75 in the bottom wall of the suction box 70 is connected to a flexible conduit 76, see Figs. 1 and 5. The conduit 76 is connected at its opposite end to a suitable suction pump, not herein shown in detail, but represented diagrammatically and indicated by the reference character 77 in Fig. 19. Preferably, the pump 77 is arranged to exhaust the air from a tank 78 connected to the suction box 70 by the conduit 76. The pump 77 is adapted to maintain a relatively low degree of vacuum in the tank 78 and suction box 70, approximately fifteen inches, whereby it acts to suck the fibrous stock from the tank 10 and deposit a layer or web of pulp P on the periphery of the drum 18 while partially extracting the liquid therefrom through its foraminous barrel 34.

Also mounted on the bracket 73 is a second suction box 80 substantially identical in construction with that of the suction box 70. The suction box 80 has a gasket 81 at its edges for sealing engagement with the barrel 34 of the drum 18 and has studs 82 slidably mounted in the bracket 73. The suction box 80 is maintained in engagement with the barrel 34 of the drum 18 by means of springs 83 and the interior of the box is connected to a flexible suction conduit 84 by means of a nipple 85. The flexible conduit 84 is connected to a suitable pump 86 through a vacuum tank 79, represented diagrammatically in Fig. 19, for evacuating the interior of the suction box 80. The pump 86 maintains a higher degree of vacuum in the suction box 80 than that in the suction box 70, approximately twenty-five inches, to extract more liquid from the web of pulp P as it is fed forwardly on the drum 18. The liquid withdrawn from the barrel 34 of the drum 18 in both suction boxes 70 and 80 is discharged by the pumps 77 and 86 through suitable drains indicated diagrammatically in Fig. 19.

Also positioned within the interior of the drum 18 and supported by the angle-iron 7 of the machine frame is a pressure manifold 90 which extends throughout the width of the barrel 34 and outwardly through the open side thereof, see Figs. 4, 5 and 18. The manifold 90 is of cylindrical form and has a plurality of circumferentially-spaced outlet ports 91, 92 and 93 in its upper portion in the form of longitudinal slots which extend a distance equal to the width of the barrel 34 of the drum 18. Nozzles 94, 95 and 96 formed integral with or fixedly attached to the manifold 90, as by welding, communicate with the valve ports 91, 92 and 93, respectively, and extend radially toward the inner surface of the barrel 34 of the drum 18. The nozzles 94, 95 and 96 each may have a series of passages 97 as shown in Fig. 4, or a single slot may be formed in each nozzle as shown in Fig. 7, adapted for communication with the holes 43 in the barrel 34 of the drum 18, and gaskets 98 are provided at their ends for sealing engagement with the drum barrel. The manifold 90 has an inlet port 99 in its under side through which air under pressure may be supplied to its interior through a conduit 100. The air conduit 100 has one end attached to the manifold 90 at the inlet port 99 with its opposite end connected to a suitable blower 101, indicated diagrammatically in Fig. 19.

A cylindrical sleeve-valve 102 is mounted for rotation within the manifold 90 with one end projecting outwardly from the open end thereof. The sleeve-valve 102 has a relatively narrow outlet port 103 in the form of a longitudinal slot adapted to register individually with the ports 91, 92 and 93 in the manifold 90 and a relatively wide slot 104 for cooperation with the inlet port 99 of the manifold in all positions of the valve. The sleeve-valve 102 is adapted to be turned by operating means, later described, to aline its outlet port 103 with one or another of the outlet ports 91, 92 and 93 in the manifold 90 to cause a blast of air to be directed by one of the nozzles 94, 95 or 96 through the foraminous barrel 34 of the drum 18.

Figure 12:
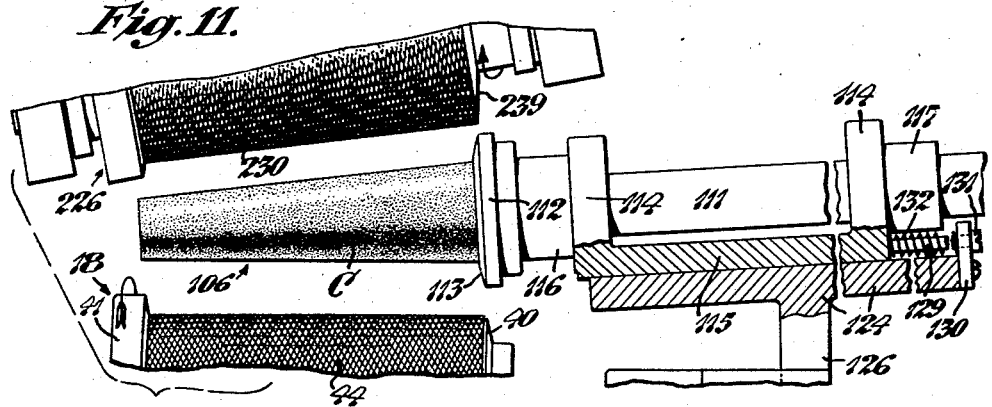
Fig. 12 is a view similar to Fig. 11 showing the forming roll as moved to its intermediate stripping position.
Figure 13:
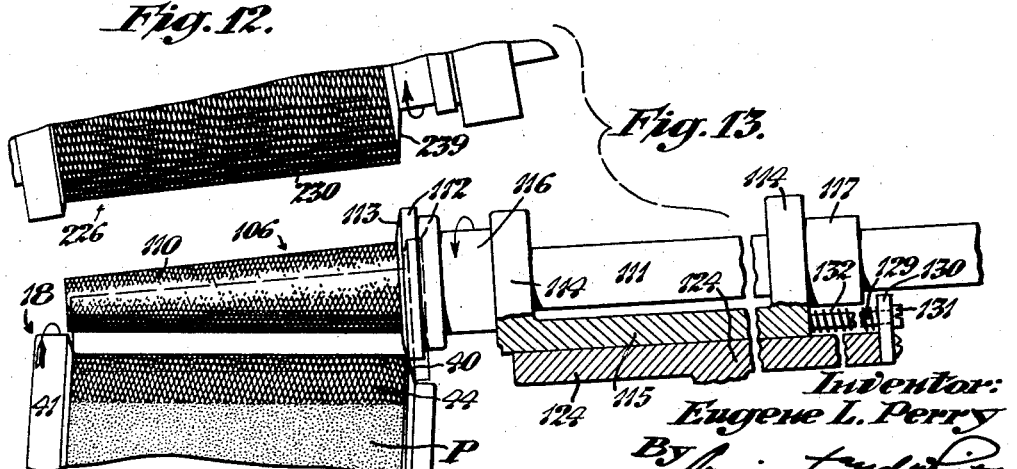
Fig. 13 is a view similar to Fig. 11 showing the forming roll as moved toward the periphery of the drum and illustrating the driving engagement between the forming roll and the drum prior to the engagement of their peripheries.

Supported for movement above the drum 18 are a plurality of hollow forming rolls or mandrels 105, 106 and 107 which may be of the same shape or of different form and construction. As herein shown, the forming rolls 105, 106 and 107 are of conical shape corresponding to that of the conical tubes C to be produced and with their peripheries of the same angle of inclination as the conical periphery of the drum 18. Thus, the web of pulp P deposited on the periphery of the barrel 34 of the drum 18 is in effect a development of the conical surfaces of the forming rolls 105, 106 and 107 so that the web may be wound on the latter in overlying layers of suitable area. As shown more in detail in Fig. 7, each of the conical forming rolls 105, 106 and 107 has a series of bores or orifices 109 extending radially thereof and one or more layers of fine mesh wire screen 110 surrounding its periphery. The forming rolls 105, 106 and 107 are each constructed integral with a hollow stem or spindle 111, see Fig. 7, having an annular flange 112 projecting radially therefrom adjacent the base of the forming roll. The flange 112 of each forming roll 105, 106 or 107 is provided with an inclined or tapered frictional driving face 113 for cooperation with the inclined driving face 40, previously described, on the drum 18. Each spindle 111 is journaled in anti-friction bearings 114 carried by the upright arms of a U-shaped bracket 115, see Figs. 11 to 13, the spindles being held against axial movement by collars 116 and 117. A stationary suction tube 118 extends axially through the bore of each spindle 111 and throughout the length of each forming roll 105, 106 and 107 with its rearward end projecting beyond the end of the spindle, see Fig. 4. A plug 119, welded or otherwise secured within the smaller end of each forming roll 105, 106 and 107, has a series of stepped shoulders forming a closure 120 for the forward ends of the roll and the suction tube 118. The lengths of the suction tubes 118 within the interior of the forming rolls 105, 106 and 107 are perforated for communication with the perforations 109 and the forming rolls are counterbored throughout their length to provide shallow annular chambers 121 surrounding the tubes.

The brackets 115 are mounted for limited sliding movement on rests 124 inclined slightly to the horizontal at the upper end of vertical slides 125, 126 and 127, see Figs. 2 and 4, and the rests have suitable guiding strips 128 overlying the sides of the brackets 115 to confine the forming rolls 105, 106 and 107 to straight line movement. A screw 129 projects rearwardly from each bracket 115 through a hole in an abutment-plate 130 attached to the end of the rest 124 and has a head 131 at its end engageable with the abutment-plate to limit the sliding movement of the bracket forwardly. Each bracket 115 is urged yieldingly toward the left as viewed in Fig. 4 by means of a spring 132 surrounding the screw 129 and tensioned between the rearward end of the bracket and the forward face of the abutment-plate 113.

The slides 125, 126 and 127 which carry the forming rolls 105, 106 and 107 are mounted for vertical movement on a plate-like bracket 133 attached to the side plates 3 and 4 of the machine frame, see Figs. 2 and 8. The bracket 133 has parallel vertical guideways 134 on its rearward side for receiving and guiding the slides 125, 126 and 127, the slides being held in the guideways by strips 135 attached to the bracket and overlying the sides of the slides. The forming rolls 105, 106 and 107 thus are adapted to be moved vertically with the slides 125, 126 and 127 on which they are mounted to carry the rolls toward and away from the periphery of the barrel 34 of the drum 18. The rolls are also movable axially by the sliding action of the brackets 115 to engage the tapered faces 113 of the flanges 112 with the tapered driving face 40 at the side of the drum 18.

The slides 125, 126 and 127 may be moved vertically in timed sequence by suitable cam-operated means such as illustrated in Figs. 2 and 4 to carry the forming rolls 105, 106 and 107 toward and away from the periphery of the barrel 34 of the drum 18. Each slide 125, 126 or 127 has a knuckle-pin 137 projecting rearwardly therefrom on which is pivoted a crosshead 138 at the end of a connecting rod 139. Each rod 139 carries a similar crosshead 140 at its lower end pivoted on a knuckle-pin 141 projecting laterally from one end of a lever 142, 143 or 144. The levers 142, 143 and 144 are arranged in side-by-side relationship and pivotally mounted intermediate their ends on a shaft 145 supported by a bearing-bracket 146 at the base of the machine. Counterweights 150 are slidably adjustable along the levers 142, 143 and 144 for partially balancing the weight of the slides 125, 126 and 127 and the forming rolls 105, 106 and 107 carried thereby. Between the shaft 145 and counterweights 150 the levers 142, 143 and 144 carry follower-rollers 151 which bear respectively against cams 152, 153 and 154, see Figs. 1, 2 and 4.

The cams 152, 153 and 154 are mounted fast on a shaft 155 journaled in suitable bearings 156 fastened to the corner-posts 2 at one end of the machine frame and a bearing-bracket 157 supported at the base of the machine, see Fig. 4.

Each cam 152, 153 and 154 has three separate lobes 158, 159 and 160, see Fig. 2, extending respectively throughout substantially 120° of its circumference. The rotation of each cam 152, 153 and 154 will cause its lobe 158 to lower the slide and forming roll 105, 106 or 107 related thereto under the action of gravity to carry the roll into engagement with the periphery of the barrel 134 of the drum 18. The next adjacent lobe 159 of each cam 152, 153 and 154 will act through the rod 139 and slide 125, 126 or 127 to raise the appropriate forming roll 105, 106 or 107 away from the periphery of the barrel 34 of the drum 18. The lobe 160 of each cam 152, 153 and 154 will act to cause its related forming roll 105, 106 or 107 to be moved by gravity to an intermediate position for removing the formed article. The three cams 152, 153 and 154 are so related on the shaft 155 that each lobe 158, 159 and 160 of a particular cam is in advance of the corresponding lobe on the next adjacent cam 120° of its circumference so that the several forming rolls will be moved in succession throughout a complete cycle of operation: that is, first toward the drum 18 to contact its barrel 34 with a dwell thereon; then away from the drum to its uppermost position; next to an intermediate position with a dwell; and then down onto the drum again. In Fig. 2 the forming roll 107 is shown as raised by the lifter action of the lobe 159 of the cam 154; the forming roll 106 as moved to its lowermost position by the action of the lobe 158 of the cam 153; and the forming roll 105 as moved to its intermediate position by the action of the lobe 160 of the cam 152.

As shown in Fig. 4, a nipple 161 is connected to the rearwardly extending end of the suction tube 118 of each forming roll 105, 106 and 107 by means of a coupling 162 and the nipples are connected to the ends of flexible conduits 163 by means of clamps 166. The opposite ends of the flexible conduits 163 are connected respectively to nipples 171 communicating with ports 180 in rotary ring-valves 172, 173 and 174 surrounding a suction box or manifold 175, see Figs. 2, 9 and 10, the manifold being supported on the machine frame in any suitable manner. The suction manifold 175 is of cylindrical shape and is provided with radial ports 176, 177 and 178 shown in Figs. 9 and 10. The interior of the manifold 175 is connected by a conduit 179 to the intake of the suction pump 86, previously mentioned and indicated diagrammatically in Fig. 19. The ring-valves 172, 173 and 174 surrounding the cylindrical suction manifold 175 each has a port 180 adapted to communicate with one of the ports 176, 177 or 178 in the manifold. Packing rings or gaskets 183 surround the ports 176, 177 and 178 in sealing engagement with the ring-valves 172, 173 and 174 and a spring-pressed strip 184 between the ring-valves and the manifold 175 at the side opposite from the ports tends to force the ring-valves into engagement with the gaskets. The ring-valves 172, 173 and 174 are arranged in side-by-side relationship and held against axial movement by an annular shoulder 185 at one end of the manifold and collar 186 at its opposite end. Projecting radially from each ring-valve 172, 173 and 174 is a stop-member or detent 187, see Fig. 10, engageable with a fixed abutment 188 on the machine frame to limit the rotary movement of the valve. A spring 189, see Fig. 2, connected at one end to a screw 190 projecting from each ring-valve 172, 173 and 174 and anchored at its opposite end to the machine frame tends to normally rock its respective valve to engage its detent 187 with the fixed abutment 188;

at which juncture its port 180 will register with one of the ports 176, 177 or 178 of the manifold 175.

Each of the ring-valves 172, 173 and 174 has a crank-arm 191 extending radially therefrom and pivotally connected to one end of an operating link 192, see Fig. 2. The opposite end of each link 192 is pivotally connected to a follower-arm 193 rockably mounted on a pin 194 carried by a bracket 195 supported at the base of the machine. Each of the follower-arms 193 carries a roller 196 engageable with a cam 197, 198 or 199, see Fig. 3. The cams 197, 198 and 199 are mounted fast on a shaft 200 journaled in bearings 201 on the corner-posts 2 at the right-hand end of the machine frame as viewed in Fig. 2, see also Fig. 3. Each cam 197, 198 and 199 has a lobe 202 which extends through substantially 180° of its circumference and the three cams are so related on the shaft 200 that the rise of each lobe is spaced rearwardly of the rise of the lobe of the next adjacent cam by substantially 120° of revolution of the shaft 198. The ring-valves 172, 173 and 174 are therefore adapted to be oscillated in regular timed sequence, one after another upon rotation of the shaft 200 to register their ports 180 individually with one of the ports 176, 177 or 178 in the manifold.

The cam-shafts 155 and 200 carry sprockets 203 and 204 respectively, see Fig. 2, which are fast thereon and connected to rotate in unison by means of a chain 205. The shaft 200 carries a gear 206 fast on its end, see Figs. 1 and 2, which meshes with an idler gear 207 on a countershaft 208. The idler gear 207, in turn, meshes with a gear 209 on the shaft 62, previously described as part of the drive for the drum 18. Thus the camshafts 155 and 200 are continuously driven in timed relation to the rotation of the drum 18 which, as previously explained, is driven from the motor 53 through the pulleys 54 and 55, worm 60, worm-gear 61 and pulleys 63 and 51. The cams 197, 198 and 199 are so related with respect to the cams 152, 153 and 154 that each ringvalve 172, 173 and 174 will be operated to apply suction to the interior of one of the forming rolls 105, 106 or 107 just prior to and during the contact of the roll with the pulp on the periphery of the barrel 34 of the drum 18, whereof to cause the pulp to be sucked against the periphery of the roll.

Simultaneously with the operation of the ringvalve 172, 173 or 174 to apply suction to the interior of its related forming roll 105, 106 or 107 the sleeve-valve 102 in the pressure manifold 90, see Figs. 5 and 18, is operated to cause a blast of air to be directed through the nozzle 94, 95 or 96 and the foraminous barrel 34 of the drum 18 in line with the tangential contact of that particular forming roll with the pulp on the drum 18, see Fig. 5. The operating means for the sleeve-valve 102 comprises a link 210, see Fig. 1, pivotally connected at one end to a crank-arm 211 projecting radially from the end of the valve which extends outwardly beyond the end of the manifold 90, see also Fig. 4. The opposite end of the link 210 is connected to a crank-arm 212 mounted fast on a rock-shaft 213 mounted in suitable bearings on the end-plate 6 of the machine frame. A lever 214 fast on the rock-shaft 213, see Fig. 1, has a follower-roller 215 at one end engageable with the periphery of a cam 216 fast on the cam-shaft 155. The lever 214 normally tends to rock in clockwise direction, as viewed in Fig. 1, under the tension of a spring 217 having one end anchored to the machine frame and its opposite end connected to the lever. The spring 217 thus acts to maintain the follower-roller 215 in engagement with the periphery of the cam 216. The cam 216 has a concentric peripheral portion 218 which extends throughout slightly less than 240° of its circumference with a slight depression 219 of short length located midway between its ends. Adjacent one end of its concentric portion 218 the cam 216 has a shouldered lobe 220 of greater radius which extends throughout only a few degrees of the circumference and then rises into a longer lobe 221, the lobe 220 with the lobe 221 extending through substantially 120° of the circumference. At the end of the lobe 220 is a short lobe 222 of still greater radius which extends throughout only a few degrees of the circumference and then merges into the concentric peripheral portion 218. The arrangement of the sleevevalve 102 is such that its port 103 is positioned between the ports 92 and 93 in the manifold 90 when the follower-roller 215 is in engagement with the concentric peripheral portion 218 of the cam 216. During rotation of the cam 216 the depression 219 will pass under the follower-roller 215 to cause the lever 214 to be rocked by the spring 217 in clockwise direction as viewed in Fig. 1. Consequently, the shaft 213 will be rocked to act through the link 210 to rotate the valve 102 to aline its port 103 with the port 93 in the manifold 90. The air under pressure in the manifold 90 thus will be released and directed through the nozzle 96 to cause an air-blast to be projected through the foraminous barrel 34 of the drum 18. The lobes 220 and 222 are arranged to actuate the lever 214 to rotate the valve 102 in counterclockwise direction to aline the port 103 successively with the ports 92 and 91 to direct an air blast through the nozzles 95 and 94. The cam 216 is so located on the shaft 155 that the depression 219 and lobes 220 and 222 will cause the valve 102 to be actuated in synchronism with the lowering of the forming rolls 107, 106 and 105 into engagement with the barrel 34 of the drum 18 by the lobes 158 of the cams 154, 153 and 152 so that at the instant the periphery of one of the forming rolls is engaged with the pulp on the periphery of the drum a blast of air will be directed through the barrel 34 of the latter below that particular forming roll to press the pulp against the roll.

Means are provided for compacting and felting the pulp after it has been applied to the peripheries of the forming rolls 105, 106 and 107. As hereinafter illustrated the compacting means are in the form of presser-rolls 225, 226 and 227 mounted for rotation on an arch or gantry 228, see Fig. 4, which supports them above the forming rolls 105, 106 and 107. The arch-like gantry 228 has standards or posts 229 supported from the angle-irons 7 of the machine frame, see Fig. 1. The presserrolls 225, 226 and 227 are of the same conical shape as the forming rolls 105, 106 and 107 and each carries a fine mesh screen 230 surrounding its imperforate periphery, see Fig. 7. The presser-rolls 225, 226 and 227 are preferably of hollow construction and have disks 231 and 232 secured to their ends with axial bores for receiving a central shaft 233 projecting therebeyond. The presserrolls 225, 226 and 227 are mounted fast on the shafts 233 and the ends of the latter are journaled in anti-friction bearings 234 and 235 carried by the depending arms of inverted U-shaped brackets 236 bolted to the under side of the gantry 228. The shaft 233 is held against axial movement by collars 237 and 238 abutting the bearings 234 and 235 and the hubs of the disks 231 and 232. As shown in Fig. 11, the end face of the disk 232 of each presser-roll is of beveled construction to provide a frictional driving face 239 adapted to engage with the beveled face 113 of the flange 112 on its related forming roll. A pulley 240 is mounted fast on the outer end of each shaft 233 beyond the bearing 235.

The three presser-rolls 225, 226 and 227 are arranged to be rotated continuously by a belt 244, see Figs. 1 and 2, in driving engagement with their pulleys 240 and extending around an idler pulley 245 journaled on a stud 246 held in a bearing supported at the end of the gantry 228. The belt 244 is arranged to be driven by a pulley 247 mounted fast on a shaft 248 journaled in a bracket 249 at the opposite end of the gantry 228 from the idler pulley 245. The shaft 248 is driven from an electric motor 250, see Fig. 2, through reduction gearing comprising a gear 251 on the shaft which meshes with a pinion-gear 252 on a countershaft 253. A large pulley 254 on the countershaft 253 is driven from a smaller pulley 255 on the shaft of the motor 250 by means of a belt 256. The motor 250 is mounted on a shelf or platform 260 supported from the machine frame and the upright or strut 59, previously referred to.

Idler pulleys 261 and 262 arranged above and laterally offset from the pulleys 240 press against the belt 244 to maintain it in driving engagement with the pulleys on the shafts of the presser-rolls. The idler pulleys 261 and 262 are journaled on studs 263 carried by brackets 264 bolted to the gantry 228, see Fig. 2. An idler pulley 266 journaled on a stud 267 at the end of a pivoted arm 268 bears against the belt 244 between the driving pulley 247 and the pulley 240 on the end presser-roll 225. The arm 268 is pivotally mounted on a stud 269 projecting from the gantry 228 and a spring 270 connected to the arm tends to press the pulley 266 against the belt 244. Thus the arm 268 and idler pulley 266 constitute a belt-tightener for insuring a firm driving engagement between the belt 244 and the pulleys 240. One form of the invention having been described in detail its mode of operation is explained as follows:

For the purpose of explanation let it be assumed that the apparatus is in operation with its parts in the position shown in Figs. 1 and 2. At this stage of the operation the forming roll 105 is in intermediate position to provide for removing a formed article therefrom; the forming roll 106 is in its lowermost position with the pulp being applied thereto from the drum 18; and the forming roll 107 is in its uppermost position with the presser-roll 227 pressing against the pulp on its surface. The drum 18 is driven continuously from the motor 53 through the speed-reduction gearing comprising the motor-pulley 54, belt 57, pulley 55, shaft 56, worm-gear 60, worm-wheel 61, shaft 62, pulley 63, belt 64, pulley 51 and shaft 45 to which the drum is keyed. The cam-shaft 200 is driven continuously at further reduced speed by the small gear 209 on the shaft 62 which drives the gear 206 on the cam-shaft through the pinion 207. The cam-shaft 155 is driven in synchronism with the cam-shaft 200 by means of the sprockets 203 and 204 and chain 205. The presser-rolls 225, 226 and 227 are driven continuously from the motor 250 through the reduction gearing comprising the motor pulley 255, belt 256, pulley 254, shaft 253, gears 252 and 251, shaft 248, pulley 247 and belt 244 which drives the pulleys 240 on the presser-roll shafts 233.

During the rotation of the drum 18 suction is applied continuously to the interior of the suction box 70 by means of the suction pump 77 and conduit 76, see Figs. 4, 5 and 19. The suction in the box 70 draws the liquid pulp stock from the tank 10 against the periphery of the foraminous barrel 34 of the drum 18 with the liquid filtering through the screens 44 and holes 43 and the pulp being deposited on the face of the screen to form a layer or web of pulp P. As the pulp stock is continuously supplied to the tank 10 through the inlet pipe 30 and circulated through the overflow or return pipe 31 the level of the stock in the tank is maintained constant to cause a predetermined amount of pulp to be continuously deposited on the periphery of the drum 18. Due to the angular adjustability of the baffle-plate 26 a web of pulp may be deposited on the barrel 34 of the drum 18 of gradually increasing thickness laterally of the width of the drum. The rotation of the drum 18 acts to feed the web of pulp P away from the tank 10 and the suction box 80 acts to extract additional liquid from the pulp on the drum.

As shown in Figs. 5 and 7, the periphery of the forming roll 106 is in engagement with the web of pulp on the periphery of the drum 18 on a horizontal line of tangency therewith and the forming roll is driven by the engagement of its friction face 113 with the frictional driving face 40 on the drum. At this juncture the ring-valve 173 on the suction manifold 175 is held in such position by the spring 189, see Figs. 2 and 9, that its port 180 will register with the port 177 in the manifold 175 so that suction is applied to the interior of the forming roll 106 to cause the web of pulp P to be sucked against its periphery and wound thereon as the roll rotates; the suction in the roll also acting to extract liquid from the pulp on the roll. The web of pulp P deposited on the conical periphery of the drum 18 is in effect a development of the conical periphery of the forming roll 106 so that the web will be wound on the forming roll in overlying layers of the appropriate area. Due to the provision for angular adjustment of the plate or blade 26 in the pulp-box or tank 10 the pulp may be deposited on the periphery of the drum 18 in a layer or web of graduated thickness across the width of its barrel 34 so that a greater thickness of pulp will be applied to either end of the forming roll 106. For example, with the blade adjusted in the position shown in Fig. 6, the pulp applied to the forming roll will increase in thickness toward the smaller end of the cone-tube so that it may be compacted to greater density and hardness as is sometimes desirable.

The rotation of the cam-shaft 155 turns the cams 152, 153 and 154 to operate the slides 125, 126 and 127 and to move the forming rolls 105, 106 and 107 toward and away from the drum 18. Assuming that the forming rolls are in the position illustrated in Fig. 1, as previously described, and indicated in Fig. 15, the rolls are first shifted to the position indicated in Fig. 16, see the chart in Fig. 14 between lines Y and Z. During this action the lobe 159 of the cam 153 will engage the follower-roller 151 on the lever 143 and rock the latter in counterclockwise direction, as viewed in Fig. 2. The lever 143 acting through the connecting rod 139 will therefore lift the centrally located slide 126 to raise the forming roll 106 away from the periphery of the drum 18 and toward the periphery of the presser-roll 226. As the forming roll 106 is moved away from the periphery of the drum 18 the pulp thereon will be disconnected from the web of pulp P on the drum 18 and the web then will be advanced by the drum to contact the next forming roll 105 of the series. As the forming roll 106 is moved upwardly toward the presser-roll 226 its friction face 113 first will engage the beveled driving face 239 on the presser-roll as the spring 132 acting on the slide 115 tends to force the friction faces into driving engagement. Due to this engagement between the driving faces 113 and 239 the forming roll 106 will be rotated prior to the engagement of the pulp on its periphery with the periphery of the presser-roll 226; this action being designed to insure a proper rolling contact between the pulp-coated forming roll and presser-roll at the start of contact to prevent scuffing of the pulp on the forming roll. In other words, as the forming roll 106 approaches the periphery of the presser-roll 226 it is started to rotate and its speed of rotation is increased as its beveled driving face is moved toward the axis of the presser-roll until its periphery has the same linear velocity as the periphery of the presser-roll. After the pulp on the periphery of the forming roll 106 makes contact with the periphery of the presser-roll 226 the latter acts to compress and compact the layers of pulp on the roll into a homogeneous mass to form the cop-tube C.

During the first stage of the compressing operation suction is maintained within the forming roll 106 to maintain the pulp in place thereon and assist in the shaping of the tube, while also serving to exhaust the liquid squeezed therefrom. The application of suction to the interior of the forming roll 106 is controlled by the cam 198 on the shaft 200, see Fig. 3, and when the cam has been rotated throughout substantially 60° of its circumference its lobe 202 will actuate the follower-arm 193, see Fig. 2 which shows the adjacent cam 199 of the same contour, and through the link 192 will rock the ring-valve 173, shown in Fig. 9, against the action of its spring 189 to close the port 177 in the manifold 175. As the suction in the forming roll 106 thus is discontinued the presser-roll 226 still will continue its pressure against the pulp on the forming roll to slightly stretch the shaped mass whereof to loosen the formed article to facilitate its removal when the roll is lowered into doffing position.

Simultaneously with the raising of the forming roll 106 the lobe 158 on the cam 152 will effect release of the lever 142 to allow the slide 125 and its related forming roll 105 to descend by gravity to contact with the pulp on the drum 18. The ring-valve 172 then will be actuated by the lobe 202 of the cam 197, see Figs. 2, 3 and 9, to apply suction to the interior of the forming roll 105. The sleeve-valve 102 now will be actuated by the lobe 222 of the cam 216, see Fig. 1, to displace its port 103 from the position shown in Fig. 5 and move it into register with the port 91 in the manifold 90 whereof to direct an air-blast through the nozzle 94 and the foraminous barrel 34 of the drum 18 directly below the forming roll 105. The lobe 160 on the cam 154 then will act on the lever 144 to cause the forming roll 107 to descend by gravity to a position midway between its presser-roll 227 and the periphery of the drum 18 where the formed cop-tube C may be removed manually. The relative movements of the several forming rolls and the periods of suction application thereto are indicated graphically between the lines Y and Z of the chart in Fig. 14 and the interval of application of the air-blast through the nozzle 94 is indicated at e on the dotted line at the bottom of the chart as controlled by the relative position of the sleeve-valve 102. The sequence of operations of the valve 102 is indicated by the reference characters a, b, c, d and e in Figs. 14 and 18 corresponding to the depression 219, peripheral portion 218, lobe 220, lobe 221 and lobe 222 of the cam 216 for operating the valve.

The forming rolls 105, 106 and 107 remain in their relative positions indicated diagrammatically in Fig. 16 for a predetermined period of operation corresponding to substantially 120° of rotation of the cam-shafts 155 and 200. The forming rolls 105, 106 and 107 then are moved by the cams 152, 153 and 154 to the relative positions indicated diagrammatically in Fig. 17, and on the chart in Fig. 14 between the lines Z and X. The lobe 160 of the cam 153 on the cam-shaft 155, see Fig. 2, next will act to release the lever 143 to permit the slide 126 and forming roll 106 mounted thereon to descend by gravity to a position midway between the presser-roll 226 and the periphery 34 of the drum 18. The formed cop-tube C which has been loosened by the action of the presser-roll 226 during discontinuance of the suction applied to the forming roll 106 may be removed from the roll 106 by sliding it axially over the end thereof.

The slide 125 and forming roll 105 are raised by the lobe 159 of the cam 152 to subject the pulp wound on the periphery of the forming roll to the action of the presser-roll 225. The slide 127 carrying the forming roll 107 is released in the meantime by the lobe 168 of the cam 154 to allow the forming roll to descend by gravity to engage its periphery with the pulp on the periphery of the drum 18. Simultaneously with the movement of the forming rolls 105, 106 and 107 to the positions indicated in Fig. 17 the cam 199 on the cam-shaft 200, see Fig. 2, will release the ring-valve 174 to cause it to be operated by the spring 189 to aline its port 180 with the port 179 in the manifold 175 whereby to apply suction to the interior of the forming roll 107. The depression 219 in the cam 216 on the cam-shaft 155, see Fig. 1, will allow the lever 214, rock-shaft 213 and crank-arm 212 to rock in clockwise direction under the tension of the spring 217 and acting through the link 210 the crank-arm will rock the sleeve-valve 102, see Fig. 5, to aline its port 103 with the port 93 in the manifold 90. The air under pressure in the manifold 175 then will be directed through the nozzle 96 and foraminous barrel 34 of the drum 18 directly below the forming roll 107. After a period of operation corresponding to approximately 60° of rotation of the cam-shaft 200 the lobe 202 of the cam 197 will rock its follower-arm 193 and acting through the link 192, see Fig. 2, will rock the ring-valve 172, shown in Fig. 9, against the action of the spring 189 to release the suction applied to the interior of the forming roll 105. By reference to the chart in Fig. 14 between the lines Z and X the relative movements of the forming rolls 105, 106 and 107 and the intervals of application of suction thereto will be readily apparent, the application of the air-blast through the nozzle 96 being indicated at a on the dotted line at the bottom of the chart.

The forming rolls 105, 106 and 107 remain in their relative positions indicated diagrammatically in Fig. 17 for a predetermined period of operation corresponding to substantially 120° of rotation of the cam-shafts 155 and 200 and then are moved by the action of the cams 152, 153 and 154 to their original positions indicated diagrammatically in Fig. 15. The lobe 158 of the cam 153, see Fig. 2, then will release the lever 143 to allow the slide 126 to descend to carry the forming roll 106 mounted thereon into pulp-receiving position as indicated in Fig. 15. As the forming roll 106 descends its friction face 113 will engage the friction face 40 on the drum 18, see Fig. 13, to rotate the forming roll before the engagement of its periphery with the pulp on the periphery of the drum. The rotation of the forming roll 106 is accelerated until its periphery has the same linear velocity as the periphery of the drum 18 to prevent scuffing or breakage of the delicate web of pulp P when the latter contacts the drum. At the instant that the periphery of the forming roll 106 is engaged with the pulp on the barrel 34 of the drum 18 suction will be applied to the interior of the forming roll and an air-blast will be directed through the foraminous barrel 34 of the drum. The application of suction to the interior of the forming roll 106 is controlled by the cam 198 on the cam-shaft 200 which allows the spring 189, see Fig. 2, to rock the ring-valve 173, shown in Fig. 9, to register its port 180 with the port 177 in the manifold 175. The suction pump 86, indicated in Fig. 19, is connected to the interior of the suction manifold 175 by the conduit 179, see Fig. 9; and through the ports 177 and 180 in the manifold and valve and conduit 163 is connected to the suction tube 118, see Fig. 4, which acts to draw air and liquid through the perforations 109 in the forming roll 106 to apply suction to the periphery of the latter. The application of the air-blast is controlled by the lobe 220 of the cam 216, see Fig. 1, which acts to rock the lever 214, rock-shaft 213 and crank-arm 212 and through the link 210 rotate the sleeve-valve 102 to register its port 103 with the port 92 in the pressure manifold 90. The air under pressure in the manifold 90 is then released through the nozzle 95 and directed through the foraminous barrel 34 of the drum 18 directly below the forming roll 106. The suction through the periphery of the forming roll 106 and the air-blast through the barrel 34 of the drum 18 causes the web of pulp P to be transferred from the drum to the periphery of the forming roll and to wind thereon as the forming roll rotates. The forming roll 106 then will continue to wind the web of pulp P onto its periphery for a predetermined period of time to build up a plurality of superimposed layers.

At the same time that the forming roll 106 is moved into engagement with the pulp on the barrel 34 of the drum 18 the forming roll 105 is moved under the control of the cam 152 to its intermediate position where the formed cop-tube C may be removed and during this interval the forming roll 107 is moved by the cam 154 to carry the coating of pulp thereon into contact with its presser-roll 227. Referring to the chart in Fig. 14, the relative movements of the forming rolls 105, 106 and 107 and the period of application of suction thereto is indicated between the lines X and Y, the application of the air-blast through the nozzle 95 being indicated by the reference character c on th dotted line at the bottom of the chart. The cycle of operations of the forming roll 106 has been described in detail and the cycle of operations of the forming rolls 105 and 107 has been described generally, but it will be understood that the forming rolls 105 and 107 are operated in the same manner as the forming roll 106 and in timed relation to the operation of the latter.

Each of the forming rolls 105, 106 and 107 continues to repeat its cycle of operations for receiving and winding layers of pulp on its periphery during one-third of the cycle, compacting the pulp and then stretching the formed article during another third of its cycle and positioning the formed article to be removed during the last third of the cycle. The cycles of operation of the forming rolls 105, 106 and 107, however, follow each other in regular order so that the web of pulp is being received by and wound onto one forming roll while the pulp is being compacted on another forming roll and a formed article is being removed from the third forming roll.

Tubes of various shapes formed by the method above set forth and on the apparatus described may be used for certain purposes without further treatment, but where they are to be employed as cop-tubes for supporting packages of yarn and thread, they are generally given further treatment, for example in heated dies to amalgamate the fibers and harden and set the material of the tubes. If required, certain finishes may be given to the peripheral surfaces of the tubes and in the case of cones their pointed ends may be rounded over and polished or enameled in accordance with a usual practice.

It will be observed from the foregoing specification that the present invention provides a method of and apparatus for forming cop-tubes or similar tubular articles directly from pulp stock in one continuous process. It will be observed further that the present invention provides a method of and apparatus for automatically and continuously producing cop-tubes or similar articles one after another. It will be observed still further that the present invention provides a method of and apparatus for producing tubular articles by winding layers of pulp on one of a plurality of forming rolls, simultaneously compacting and shaping a previously formed article on another forming roll and positioning another formed and compacted article to be removed from its forming roll.

While the method and one preferred form of apparatus are herein illustrated and described, it is to be understood that variations in the steps of the method and modifications in the structure of the arrangement of the parts of the apparatus may be made without departing from the spirit or scope of the invention. Therefore, without limiting myself in this respect, I claim:

1. In an apparatus of the type indicated, a tank for containing fluent pulp stock, a carrier movable with respect to the tank to feed a web of pulp therefrom, a plurality of rotatable forming rolls mounted for movement toward the carrier to contact the pulp thereon to apply it to the rolls, and means automatically operated in timed relation to the movement of the carrier for raising one forming roll away from the carrier and simultaneously lowering another forming roll into contact with the pulp on the carrier.

2. In an apparatus of the type indicated, a tank for containing fluent pulp stock, a carrier movable with respect to the tank to feed a web of pulp therefrom, a plurality of rotatable forming rolls mounted for movement toward the carrier to contact the pulp thereon to apply it to the rolls, and cam-operated means actuated in timed relation to the movement of the carrier for raising one forming roll away from the carrier and lowering another forming roll into contact with the pulp on the carrier.

3. In an apparatus of the type indicated, a tank for containing fluent pulp stock having an open side, a rotatable drum having a foraminous barrel movable across the open side of the tank to receive and feed a web of pulp therefrom, a plurality of rotatable forming rolls mounted for movement toward and away from the periphery of the drum and adapted to contact the pulp thereon to cause it to be applied thereto, and means operated in timed relation to the rotation of the drum for alternately raising and lowering the forming rolls with respect to the drum.

4. In an apparatus of the type indicated, a tank for containing liquid pulp stock, a foraminous carrier movable relatively of the tank to feed a web of pulp therefrom, a plurality of rotatable foraminous forming rolls mounted for movement toward the carrier to receive the pulp therefrom as it is fed thereby, means for applying suction to the interior of the forming rolls to transfer the pulp from the carrier onto the rolls, means for directing an air-blast through the foraminous carrier to force the pulp against the peripheries of the forming rolls, and means operated in timed relation to the movement of the carrier for raising one forming roll away from the carrier and lowering another forming roll into contact with the pulp thereon.

5. In a machine of the type indicated, a tank for containing fluent pulp stock, a foraminous carrier movable with respect to the tank to feed a web of pulp therefrom as it is deposited on the carrier, pulp-compressing means positioned above the carrier, a plurality of rotatable forming rolls mounted for movement between the carrier and the pulp-compressing means, said forming rolls being adapted to receive the pulp transferred from the carrier onto their peripheries, and means operated in timed relationship for raising one forming roll away from the carrier and into engagement with the compressing means and lowering another forming roll into contact with the pulp on the carrier.

6. In an apparatus of the type indicated, a tank for containing fluent pulp stock, a foraminous carrier movable relatively of the tank to feed a web of pulp therefrom as it is deposited on the carrier, a plurality of rotatable presser-rolls positioned above the carrier, a plurality of forming rolls mounted for movement between the carrier and the presser-rolls, said forming rolls being adapted to receive the pulp transferred thereto from the carrier, and means for moving the forming rolls to simultaneously contact one forming roll with the pulp on the carrier, engage another forming roll with a presser-roll and position another forming roll between the carrier and its presser-roll to adapt the formed article to be removed therefrom.

7. In an apparatus of the type indicated, a tank for containing fluent pulp stock, a foraminous carrier movable relatively of the tank to feed a web of pulp therefrom as it is deposited thereon, a plurality of rotatable presser-rolls positioned above the carrier, a plurality of forming rolls mounted for movement between the carrier and the presser-rolls, said forming rolls being adapted to receive the pulp transferred thereto from the carrier, and means for simultaneously moving one forming roll away from the carrier and into engagement with its presser-roll, moving the adjacent forming roll from engagement with its presser-roll to an intermediate position where the formed article may be removed, and lowering the next adjacent forming roll from its intermediate position into contact with the pulp on the carrier.

8. In an apparatus of the type indicated, a tank for containing fluent pulp stock, a foraminous carrier movable relatively of the tank to feed a web of pulp therefrom as it is deposited on the carrier, a plurality of rotatable hollow foraminous forming rolls mounted for movement toward and away from the carrier, means operative at predetermined time intervals for lowering the forming rolls successively into contact with the pulp on the carrier, means for applying suction to the interior of the forming rolls, valve-means for controlling the suction in the forming rolls, and means operative in timed relation to the lowering of the forming rolls to operate the valve-means and apply suction to each forming roll as it is moved into contact with the pulp on the carrier.

9. In an apparatus of the type indicated, a tank for containing fluent pulp stock, a foraminous carrier movable relatively of the tank to receive and feed a web of pulp therefrom, a plurality of rotatable forming rolls mounted for movement toward and away from the carrier, means operative at predetermined time intervals for lowering the forming rolls successively into contact with the pulp on the carrier, means for directing an air-blast through the foraminous carrier to transfer the pulp from the carrier onto the peripheries of the forming rolls, valve-means for controlling the air-blast through the foraminous carrier, and means operative in timed relation to the lowering of the forming rolls for operating the valve-means to cause the air-blast to be directed through the foraminous carrier.

10. In an apparatus of the type indicated, a tank for containing fluent pulp stock, a foraminous carrier movable relatively of the tank to receive and feed a web of pulp therefrom, a plurality of rotatable hollow foraminous forming rolls mounted for movement toward and away from the carrier, means operative at predetermined time intervals for lowering the forming rolls successively into contact with the pulp on the carrier, means for applying suction to the interior of the forming rolls, means for directing an air-blast through the foraminous carrier to transfer the web of pulp from the carrier onto the preipheries of the forming rolls, valve-means for controlling the suction in the forming rolls and the air-blast through the foraminous carrier, and means operative in timed relation to the lowering of the forming rolls to operate the valve-means whereby to apply suction to each forming roll as it contacts with the pulp on the carrier and to simultaneously direct an air-blast through the carrier.

11. In an apparatus of the type indicated, a tank for containing fluent pulp stock having an open side, a rotatable drum having a foraminous barrel movable across the open side of the tank, means for applying suction within the foraminous barrel of the drum opposite the open side of the tank to cause a web of pulp to be deposited on the barrel and fed from the tank, means for applying suction to the web of pulp as it is fed beyond the tank to extract moisture therefrom, a plurality of rotatable hollow foraminous forming rolls mounted for movement toward and away from the periphery of the drum and adapted to receive the pulp transferred onto their peripheries, means for applying suction to the interior of the forming rolls during the application of the pulp thereto, and means operated in timed relation to the rotation of the drum for raising one forming roll away from the periphery of the drum and lowering another forming roll into contact with the pulp thereon.

12. In an apparatus of the type indicated, a tank for containing fluent pulp stock having an open side, a rotatable drum having a foraminous barrel movable across the open side of the tank to adapt it to receive a web of pulp deposited thereon from the tank, a plurality of presser-rolls arranged in spaced relation to the periphery of the drum, a plurality of forming rolls adapted to be carried into contact with the pulp on the drum to apply it to their peripheries, and means operated in timed relation to the rotation of the drum for raising one forming roll away from the periphery of the drum into contact with a presser-roll and lowering another forming roll into contact with the pulp on the drum.

13. In an apparatus of the type indicated, a tank for containing fluent pulp stock having an open side, a rotatable drum having a foraminous barrel movable across the open side of the tank to receive a web of pulp deposited thereon from the tank, a plurality of presser-rolls arranged in spaced relation to the periphery of the drum, a plurality of hollow foraminous forming rolls, each forming roll being adapted to receive and wind the web of pulp on its periphery when in contact with the pulp on the drum, means operated in timed relation to the rotation of the drum for raising one forming roll away from the drum and into cooperative relation to a related presser-roll and lowering another forming roll into contact with the pulp on the drum, and means for applying suction to the forming rolls to exhaust liquid therefrom.

14. In an apparatus of the type indicated, a tank for containing fluent pulp stock having an open side, a rotatable drum having a frusto-conical barrel movable across the open side of the tank to receive a web of pulp deposited thereon from the tank, a plurality of presser-rolls arranged in spaced relation to the periphery of the drum, a plurality of frusto-conical hollow foraminous forming rolls, the peripheries of the drum and forming rolls having the same angle of inclination whereof the pulp deposited on the drum will wind in overlying conical layers on the forming rolls, means operated in timed relation to the rotation of the drum for raising each forming roll away from the carrier and into engagement with its associated presser-roll and lowering another forming roll into contact with the pulp on the drum, and means for applying suction within the forming rolls to extract the liquid therefrom.

15. In an apparatus of the type indicated, a tank for containing fluent pulp stock having an open side, a rotatable drum having a frusto-conical foraminous barrel movable across the open side of the tank to receive a web of pulp deposited thereon from the tank, a plurality of presser-rolls arranged in spaced relation to the periphery of the drum, a plurality of hollow foraminous frusto-conical forming rolls, the peripheries of the drum and forming rolls having the same angle of inclination to provide that the web on the drum will be applied in overlying conical layers on the forming rolls, means operated in timed relation to the rotation of the drum for raising one forming roll away from the drum and into engagement with a related presser-roll; lowering another forming roll away from its related presser-roll to an intermediate position where the formed article may be removed; and lowering a third forming roll into contact with the pulp on the drum, and means for applying suction to the forming rolls to extract the liquid therefrom.

16. In an apparatus of the type indicated, a tank for fluent pulp stock having an open lateral side, a rotatable drum having a barrel movable across the open side of the tank to receive a web of pulp fed from the tank, a forming roll adapted to contact the pulp on the drum to cause the pulp to be applied to the periphery of the roll, and friction-driving means on the drum and forming roll adapted to cooperate for positively driving the forming roll from the drum whereby the peripheries of the drum and forming roll will travel at the same linear velocity.

17. In an apparatus of the type indicated, a tank for containing fluent pulp stock having an open lateral side, a rotatable drum having a barrel movable across the open side of the tank to receive a web of pulp deposited thereon from the tank, a forming roll adapted to contact the web of pulp on the drum to apply the pulp to the roll, and mechanically-engaging means between the drum and forming roll for initiating the rotation of the forming roll prior to its contact with the pulp on the drum so that the periphery of the roll will have the same linear velocity as the periphery of the drum at the instant of contact.

18. In an apparatus of the type indicated, a tank for containing fluent pulp stock having an open lateral side, a rotatable drum having a barrel movable across the open side of the tank for receiving a web of pulp deposited thereon from the tank, a forming roll adapted to contact the pulp on the drum to transfer the pulp therefrom onto the roll, said forming roll having a driving flange at one end, and means for moving the forming roll toward the drum to cause its flange to engage the rim of the drum to rotate the forming roll prior to its contact with the pulp on the drum so that the peripheries of the roll and drum will travel at the same linear velocity.

19. A method of making tubular articles which comprises forming a continuous web of pulp, winding the web of pulp while supporting it to form an article, compressing the wound pulp to compact it into a homogeneous mass, and simultaneously winding the web of pulp to form a second article while the pulp of the first article is being compressed whereby to continuously produce tubular articles from the web of pulp.

20. A method of making tubular articles which comprises providing a plurality of mandrels conforming to the shape of the articles to be produced, forming a continuous web of pulp, winding the web of pulp onto the several mandrels in sequence, and compressing the pulp on one mandrel while simultaneously winding the web of pulp onto another mandrel whereby to continuously produce the articles one after another.

21. A method of making tubular articles which comprises providing a plurality of mandrels conforming to the shape of the articles to be produced, forming a continuous web of pulp, winding the web of pulp in layers on one of the forming mandrels, compressing the pulp applied to said mandrel to compact the layers thereof, and simultaneously winding the web of pulp onto another mandrel while the pulp on the first mandrel is being compressed.

22. A method of making tubular articles which comprises forming a continuous web of pulp, winding the web of pulp onto a hollow foraminous mandrel, compressing the pulp applied to the mandrel to compact it thereon, applying suction to the interior of the mandrel during the winding of the pulp thereon and during part of the compressing operation, releasing the suction in the mandrel during the latter part of the compressing operation to stretch the formed article and loosen it on the mandrel to facilitate its removal therefrom, and winding the web of pulp onto another mandrel while the pulp on the first mandrel is being compressed.

23. A method of making tubular articles which comprises forming a continuous web of pulp, applying suction to the web to extract liquid therefrom, winding the web of pulp while supporting it interiorly to form a hollow article, compressing the wound pulp to compact the layers thereof, applying suction to the pulp as it is being wound and during part of the compressing operation to extract the liquid therefrom, releasing the suction on the pulp during the latter part of the compressing operation to cause stretching of the formed article, and winding the web of pulp to form another article while the pulp of the previously formed article is being compressed.

24. A method of making tubular articles which comprises providing a plurality of mandrels conforming to the shape of the articles to be produced, forming a continuous web of pulp, winding the web of pulp onto one of the mandrels, compressing the pulp wound on said mandrel to compact it thereon, winding the web of pulp onto a second mandrel during the compression of the pulp on the first mandrel, winding the web of pulp onto a third mandrel during the compression of the pulp on the second mandrel, removing the formed article from the first mandrel, and continuing the winding, compressing and article-removing operations in sequence on the plurality of mandrels.

25. A method of making tubular articles which comprises providing a series of hollow foraminous mandrels conforming to the shape of the articles to be produced, forming a continuous web of pulp, applying suction to the web to extract liquid therefrom, winding the web of pulp onto the series of mandrels in succession, applying suction to each mandrel during the winding of the web of pulp thereon, compressing the wound pulp on one mandrel while winding the web onto another mandrel, winding the web of pulp onto a third mandrel during the compression of the pulp on the second mandrel, removing the formed article from the first mandrel, and continuing the winding, compressing and article-removing operations in sequence on the series of mandrels.

EUGENE L. PERRY.